(No Model.) 5 Sheets—Sheet 1.

F. D. FOSTER.
MACHINE FOR MAKING BUTTONS.

No. 599,696. Patented Mar. 1, 1898.

Witnesses:
Thomas Durant
John B. Peyton Jr.

Inventor:
Frederick D. Foster
by Church & Church
his attys (No Model.) 5 Sheets—Sheet 2.

F. D. FOSTER.
MACHINE FOR MAKING BUTTONS.

No. 599,696. Patented Mar. 1, 1898.

Witnesses: Inventor:

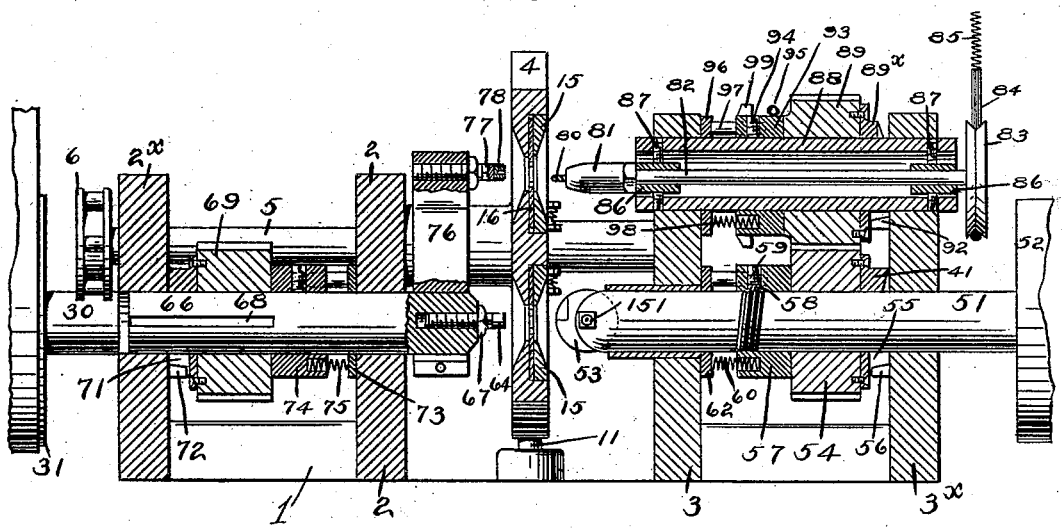

(No Model.) 5 Sheets—Sheet 4.
F. D. FOSTER.
MACHINE FOR MAKING BUTTONS.
No. 599,696. Patented Mar. 1, 1898.
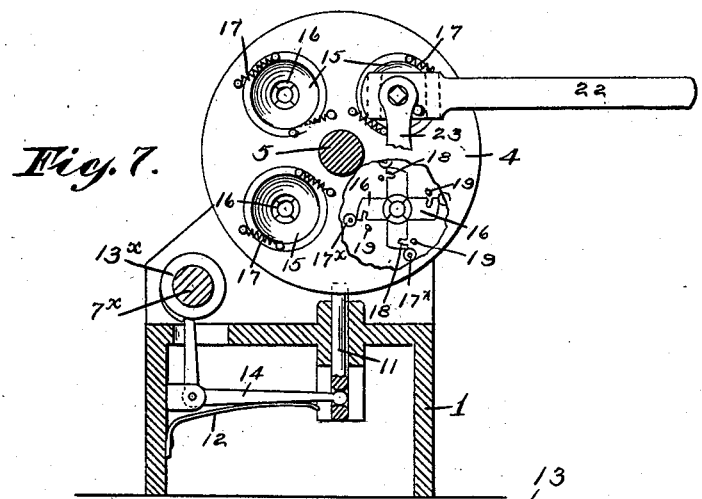
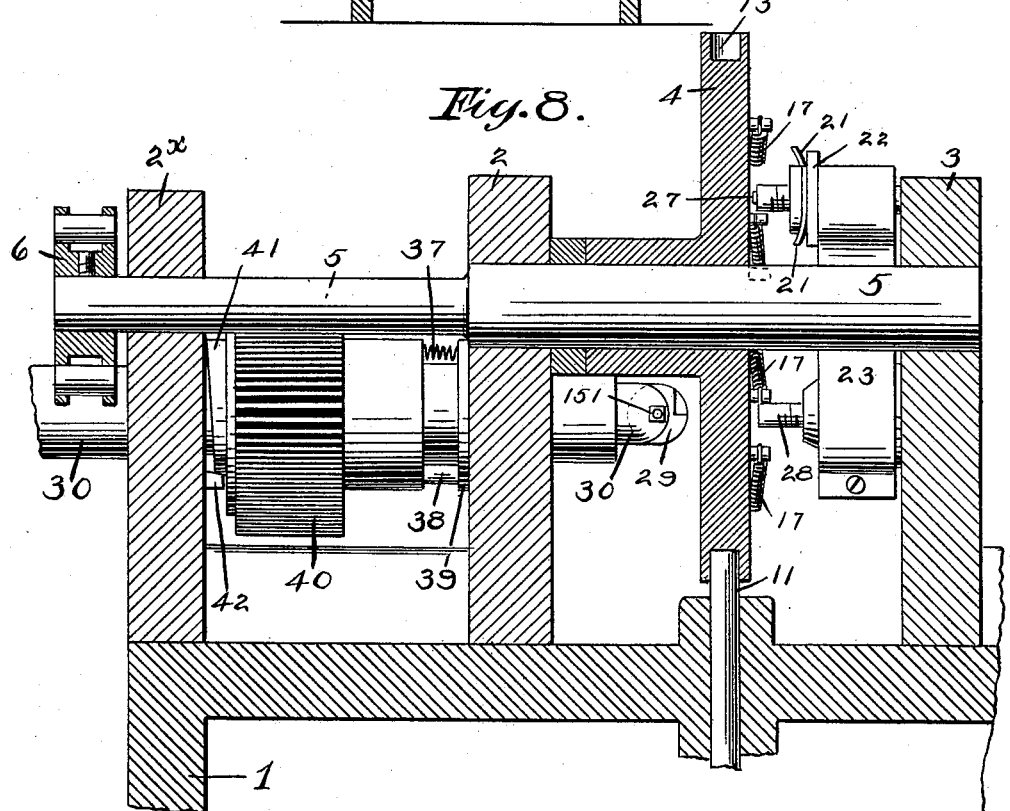
Witnesses: Inventor:

(No Model.) 5 Sheets—Sheet 5.
F. D. FOSTER.
MACHINE FOR MAKING BUTTONS.
No. 599,696. Patented Mar. 1, 1898.
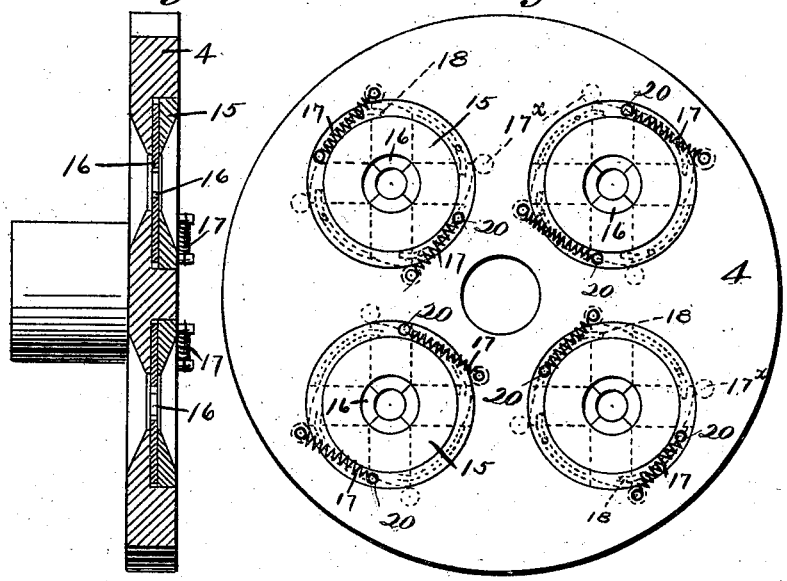
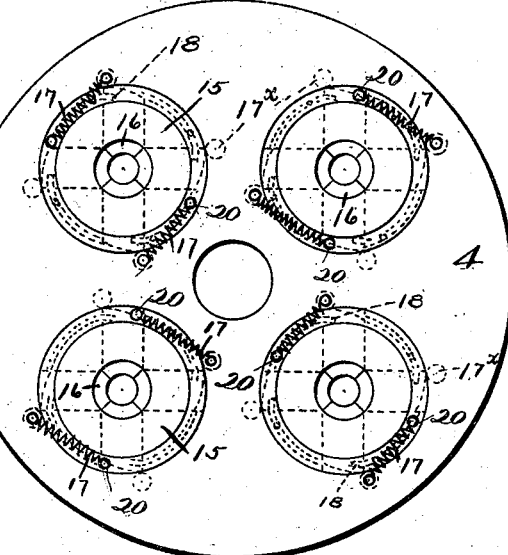
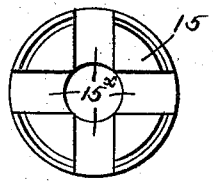
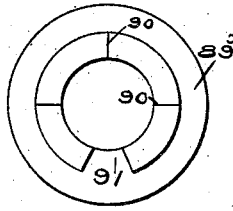
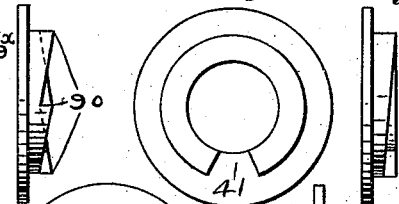
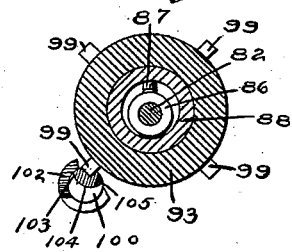
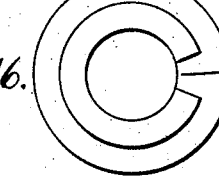
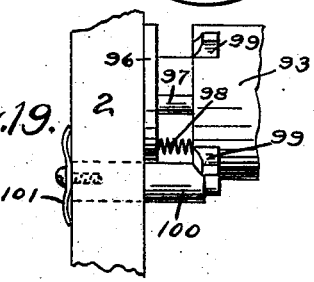
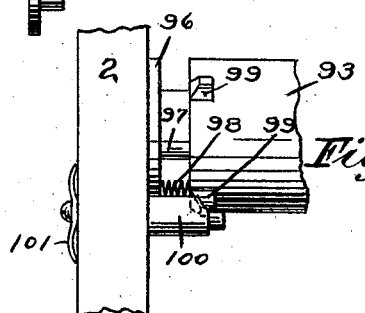
Witnesses: Inventor:

UNITED STATES PATENT OFFICE.

FREDERICK D. FOSTER, OF JERSEY CITY, NEW JERSEY.

MACHINE FOR MAKING BUTTONS.

SPECIFICATION forming part of Letters Patent No. 599,696, dated March 1, 1898.

Application filed March 5, 1897. Serial No. 626,148. (No model.)

*To all whom it may concern:*

Be it known that I, FREDERICK D. FOSTER, of Jersey City, in the county of Hudson and State of New Jersey, have invented certain new and useful Improvements in Machines for Making Buttons; and I do hereby declare the following to be a full, clear, and exact description of the same, reference being had to the accompanying drawings, forming a part of this specification, and to the reference-numerals marked thereon.

My present invention has for its object generally to provide a machine for making articles having two opposite faces or sides shaped and operated upon by suitable tools and which shall be automatic in its operation and complete the articles from blanks fed to it without the necessity of removing said blanks from the holding devices to which they are first applied. Machines of this general description are particularly desirable for making buttons of pearl or other material, which are faced on opposite sides and perforated, and the present embodiment of my invention is particularly adapted for making these from the ordinary blanks or disks of mother-of-pearl; but it will be understood that other articles having two opposite faces to be shaped or treated could be made by a similar machine employing operating or shaping tools of any desired description, and I do not, excepting as specifically stated in the claims, desire to confine my invention to mechanism for making any particular article, as various modifications will occur to those skilled in the mechanical arts, and the capabilities of a machine of this general description are various.

Figure 1:
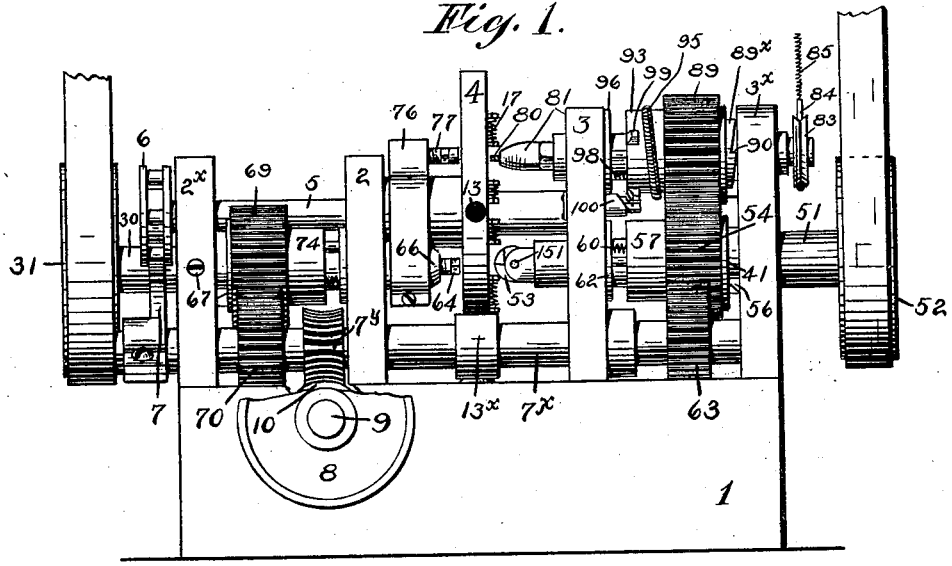
Figure 23:
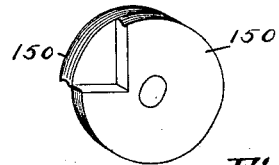
Figure 24:
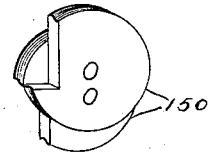
Figure 2:
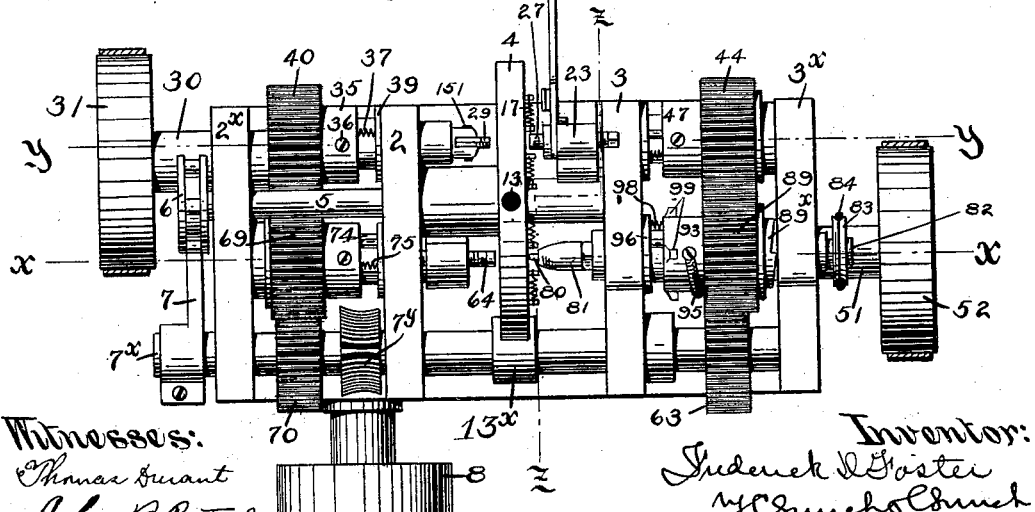
Figure 3:
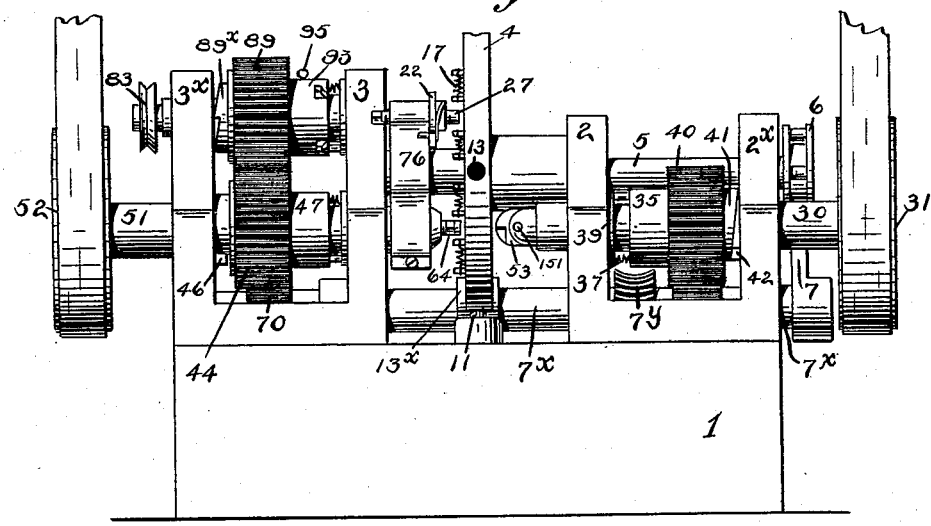
Figure 4:
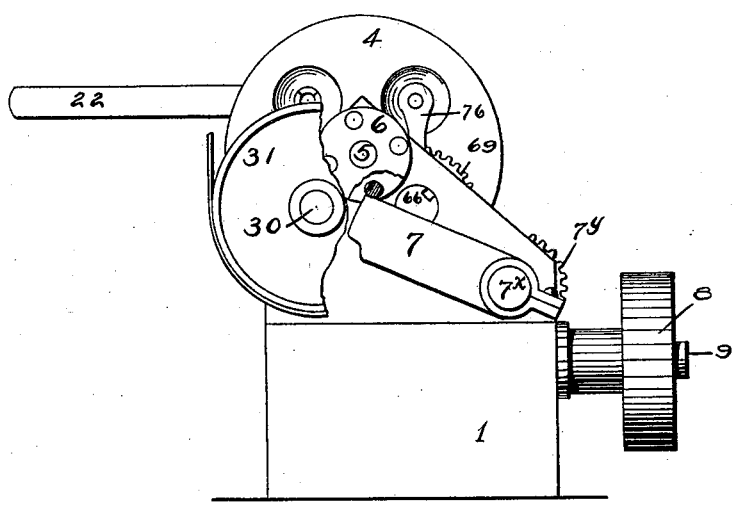

In the drawings, Figure 1 is a rear elevation of a machine constructed in accordance with my invention; Fig. 2, a plan view of the same; Fig. 3, a front elevation; Fig. 4, an end view with portions broken away; Fig. 5, a longitudinal sectional view on the line $x\ x$ of Fig. 2; Fig. 6, a similar view on the line $y\ y$ of Fig. 2; Fig. 7, a sectional view on the line $z\ z$ of Fig. 2; Fig. 8, a central sectional view through the chuck-holder; Fig. 9, a face view of the chuck holder or head; Fig. 10, a sectional view of the same; Fig. 11, a view of the rear face of the chuck-actuating ring; Figs. 12 and 13, face and side views, respectively, of the cam-ring operating the drill carrying the arbor; Figs. 14 and 15, face and side views, respectively, of the cam-rings for actuating various reciprocating arbors carrying cutting-tools; Figs. 16 and 17, similar views of other cams for actuating the arbors carrying the blank-holding stops; Fig. 18, a cross-sectional view of the arbor in which the drill-spindle is mounted, taken on the line $v\ v$ of Fig. 5; Figs. 19, 20, and 21, detail views of the escapement mechanism controlling the drill-arbor-actuating devices; Fig. 22, a view of the escapement-block removed; Fig. 23, a perspective view of one of the cutters; Fig. 24, a modification of the same.

Similar reference-numerals in the several figures indicate similar parts.

1 indicates the base of the machine, having formed upon or secured to it the uprights 2 $2^\times$ and 3 $3^\times$, the former constituting a frame hereinafter designated as 2 and the latter a similar frame or support designated as 3, each frame having formed therein bearings for the various operating parts, as will be described.

Between the frames 2 and 3 is arranged a rotary holder or chuck-support 4 in the form of a disk, secured to a horizontal shaft 5, journaled in the frames 2 and 3, said support being provided with a series of chucks or holders open at both faces of the disk and each adapted to grasp and hold a blank at its periphery, so that both sides or faces may be operated upon by suitable tools to form the buttons. The number and specific construction of the chucks are immaterial; but in the present machine I have shown four so spaced that some or all of the blanks in the different ones are being operated upon while the holder is at rest, and the intermittent movement of the holder is timed to carry the blank from one tool to the next. The shaft 5 is provided at the outer end with a lantern-wheel 6, with which is adapted to engage an arm or tappet 7 on a controlling-shaft $7^\times$, rotated from a pulley 8 through the shaft 9, worm 10, and worm-wheel $7^y$, and in order to secure the holder rigidly with the chucks in line with the various tools I provide in the base a pin 11, projected by a spring 12 into one of the series of apertures 13 in the periphery of the holder, said pin being held retracted during the rotation of the holder by a cam 13×, operating through a bell-crank lever 14, as shown in Fig. 7.

The blank-chucks in the holder are formed by recessing one face of the holder around the perforations and locating therein rings 15, each of which has a series of recesses 15× therein, in which are arranged radially-movable chuck-jaws 16, having the segmental inner ends and the inclined outer ends adapted, when the rings are rotated in one direction by springs 17, secured at one end to the plate, to engage projections 17× in the holder and cause the inward movement of the jaws to grasp the button-blank between them. The jaws 16 are also provided with inclined slots 18 at one edge, adapted, when the ring 15 is rotated in the opposite direction against the tension of the spring, to engage the stationary pins 19 in the holder and cause their outward movement, thereby opening the chuck. The rings 15 are each provided with studs 20, adapted to be engaged by projections 21 on an operating-lever 22, mounted on a movable block or arm 23, which latter is moved into proximity with the face of the holder when the holder is at rest, as will be described.

The projections 21 upon the lever 22 are preferably in the form of springs attached at one end, said springs constituting latches, so that there will be no liability of breaking the parts should the ends of the springs strike the pins on the chuck as the arbors are moved in or out or if the lever is rotated in the wrong direction on its pivot. The arm 23 is secured rigidly upon a longitudinally-movable arbor 24, mounted in suitable bearings in the frame 3 and prevented from rotation by a screw 25, entering a suitable keyway 26 in the arbor, and said arm is further provided at its upper end with a spring-projected pin or ejector 27, adapted to come opposite a chuck-center when the holder is at rest, and at the lower end and in line with the center of the arbor is an adjustable pin or projection 28, adapted to coöperate with the face of a blank held in one of the chucks and while being operated upon by a rotary cutting-tool 29, mounted on a rotary and longitudinally-movable arbor 30, arranged in bearings in the frame 2 opposite the arbor 24. (See Fig. 6.) The outer end of the arbor 30 is provided with a driving-pulley 31, actuated by any suitable driving-belt, and the inner end is provided with a cutting-tool 29 of any suitable description, preferably one arranged to true up the back of a button held by the chuck in alinement.

The arbor 30 is provided with a thread at 33, with which engages a sectional nut 34, arranged in an aperture in a collar 35, encircling the arbor and adapted to be clamped rigidly to said arbor by a screw 36, whereby when the screw is tightened the collar is held rigidly on the arbor, but by loosening the screw, holding the collar stationary and rotating the arbor, the collar may be adjusted longitudinally of the arbor to regulate the projection of the tool, as will be explained. The collar 35 is further provided with recesses for springs 37, operating against a collar 39, abutting against the frame, and thereby causing the outward movement of the arbor, the relative positions of the collars 35 and 39 being insured by pins 38.

40 indicates a gear journaled loosely on the arbor 30 and having in its rear face a cam-ring 41×, having a recess 41 and an inclined cam portion (see Fig. 15) for engaging with a stationary cam or projection 42 on the frame 2×. The arbor being pressed normally outward by the springs 37 operating between the collar and frame, the gear 40 is held against the frame when the chuck-holder is being rotated, the cam projection 42 being then in the recess 41; but when the tool is to be brought in contact with the blank in the chuck alined with it the rotation of the gear (which is preferably timed with reference to the other parts by adjustment) will cause the cam projection 42, coöperating with the cam-ring, to move the arbor longitudinally gradually until the end of the cam passes off the projection 42.

As it is necessary that the blank operated upon by the tool 29 be held against the thrust of the tool, the arbor 24, carrying the projection 28, must be brought in contact with the face of the blank, and this movement of the arbor 24 is caused by a driven gear 44, sleeved loosely thereon and having a ring 45× on its rear side, having a recess 45, with which coöperates a cam projection 46 on the frame 3 in a manner similar to the recesses 41 and projection 42 on the gear 40, excepting that, the shoulder at the edge of the recess being abrupt, the arbor 24 is moved clear in and held rigidly. A collar 47, secured rigidly on the arbor 24, is provided with recesses for springs 48 and steadying-pins 49 on a collar 50, engaging the frame 3 and causing the retraction of the arbor 24 and stop 28. From this construction it will be seen that the gears 40 and 44 being rotated at the same speed, indirectly from the shaft 7×, will cause the simultaneous approach of the arbors 24 and 30, the former moving the stop 28 in contact with the blank and held and the latter moving gradually to feed the cutter, and the lever 22 on the arm 23 being then moved toward the chuck-holder the projections 21 on said lever will be in such position that when the lever is moved on its pivot the chuck-ring may be rotated and the blank that was held by the chuck be released and ejected by the spring-pin 27 and a new one inserted in the chuck and held, when the lever 22 is released and falls down and the arm 23 retracted.

51 indicates a rotary and longitudinally-movable arbor mounted in the frame 3 on the face side of the chuck-holder, carrying at its outer end a driving-pulley 52, adapted to be rotated by a suitable belt, and at its inner end a button-facing tool 53, to be presently described. This arbor is actuated longitudinally in a manner similar to the arbor 30, being provided with a gear 54, meshing with the gear 44, and having a cam-ring similar to ring $41^\times$, with a recess 55 in its rear face, having an inclined side adapted to coöperate with a cam projection 56 on the frame. Mounted also on the shaft is a collar 57, (corresponding with the collar 35,) having the nut 58 and screw 59, and also a series of springs 60 between it and the collar 62, which engages the frame, for the purpose of retracting the arbor. The gear 54 meshes with a gear 63 on the shaft $7^\times$, which shaft thus drives both the gears on the arbors 30 and 51 at the same speed.

The back-stop for holding the blank operated upon by the facing-tool against the thrust of the latter consists of an adjustable stop or pin 64 on the end of a longitudinally-movable arbor 66, (corresponding to the arbor 24,) mounted in the frame 2, being prevented from rotary movement by a screw 67, entering a keyway or slot 68 and having a gear 69 loose thereon, meshing with a gear 70 on the shaft $7^\times$ and also with the gear 40 on the arbor 30. The rear face of this gear 69 is provided with a cam-ring similar to the ring $45^\times$, having a recess 71, with which coöperates the cam projection 72 on the frame for projecting the arbor at stated times, and the arbor is further provided with the collar 73, rotating with it, and between which and the collar 74 are springs 75 for retracting said arbor in a manner similar to the means for the same purpose on the arbor 24.

76 indicates an arm (corresponding to the arm 23) secured to the arbor 66 and carrying at its upper end an adjustable hollow stop-arm 77, preferably provided with a wooden block 78 for holding the button-blank that is being drilled against the thrust of the drill.

In the manufacture of pearl buttons it is necessary that the number of apertures in the blank, sometimes two, but usually four, be formed by drilling, and owing to the small area of the button and the short distance between the holes it is impracticable to employ a gang of drills for the purpose, and therefore a single drill must be employed, which is reciprocated and moved rapidly from one position to another, and in the present machine this must be accomplished in the same space of time required for facing and truing the back of a button-blank—in other words, while the chuck-holder is at rest.

In the present machine the eye-drilling device is above the facing-tool and is the last of the devices operating upon the button before being released from the blank-chuck. 80 indicates the drill, secured in a drill-chuck 81 on a small spindle 82, to the outer end of which is attached a pulley 83, actuated by a belt 84, preferably provided with a spring 85, interposed in its length to allow the spindle to change its position relative to the pulley driving the belt without interfering with the proper rotation of the drill-spindle, or other belt-tightening devices could be used.

The drill-spindle 82 has its bearings in sleeves 86, secured by set-screws 87 eccentrically within a hollow longitudinally-movable and intermittently-rotated arbor 88, mounted in bearings in the frame 3 directly opposite the stop-arm 77. The drill-spindle is constantly rotated, and the drill must not only be capable of being retracted sufficiently to clear the blank chuck-holder when the latter is rotated, but must be retracted a less amount, sufficient to clear the button operated upon, and be projected again the requisite number of times to pass through the blank and form the requisite number of eyes therein. The present machine is arranged to drill four eyes in the buttons, so that the arbor 88 must be moved to bring the drill up to and pass it through the blank, then retracted sufficiently to clear the blank, rotated a quarter-turn, projected to drill the next eye, retracted again, and so on until all the eyes are drilled, and then retracted to clear the chuck-holder, which latter then "indexes" or rotates to bring the next blank in position to be drilled. The means employed for causing the longitudinal movements of the arbor 88 is generally similar to that for moving the arbors 26 and 30, embodying the gear 89, meshing with gear 54, and sleeved loosely on the arbor and having at its rear end a cam-ring $89^\times$, provided with four cam projections 90, a deep recess 91 being formed at the base of the last cam, and with these coöperates a cam projection 92 on the frame. Secured to the arbor by a screw 94 is a collar 93, connected by a spring 95 with the gear 89, so that the arbor if not arrested by other means would be rotated through the spring, and 96 indicates a collar loose on the arbor but resting against the frame 3, having pins 97, operating in the collar 93, and springs 98 are interposed between the collars 93 and 96 for the purpose of retracting the arbor and holding the cam-surfaces of the gear against the projection 92 on the frame.

While any suitable means could be employed for intermittently rotating the arbor a partial rotation in order to successively bore the eyes, I prefer to employ an automatic escapement actuated by the longitudinal movements of the arbor and therefore controlled by the cams on the gear 89. With this idea in view I provide the collar 93 with lugs 99, corresponding in number with the number of button-eyes, inclined at their inner sides next the chuck-holder and adapted to coöperate with an escapement-block 100, having a bearing-pin extending through one side of frame 3 and provided with a leaf-spring 101, offering friction enough to prevent accidental turning. This escapement-block is provided with an inclined shoulder 102 and a bearing projection 103 inside the shoulder, which projection is cut away at 104, as shown in Fig. 22, and is further provided with a projection or shoulder at 105, one or the other of said projections being always in the path of the lugs 99 on the collar. The operation of this portion of the machine will now be understood. The parts being in the position shown in the drawings and the button-blank to be drilled being arranged in its chuck opposite the drill, the first portion of the rotation of the gear 89 will cause the inclined side of the recess 91 to ride up on the cam projection 92 on the frame, forcing the arbor and the drill-spindle inward. One of the lugs 99 on the collar 93 is engaged with the projection 103, which is turned to the position shown in Fig. 21, and the collar is prevented from rotation, but the spring 95 is put under tension as the gear revolves. As the arbor moves inward the forwardly inclined edge of the lug 99 engages the inclined shoulder 102 and gradually turns the escapement-block until by the time the drill has passed through the button the projection 103 has turned out of the path of the lug 99, though it is still retained by a shoulder 106 at the end of 103, until the rearward movement of the arbor, caused by the spring when the next projection 90 passes off the cam 92, is sufficient to withdraw the drill from the button. As soon as the drill is clear of the button the lug 99 on the collar becomes disengaged from the shoulder 106 and the spring 95 turns the collar and arbor a quarter of a rotation, the lug 99 just disengaged striking the shoulder 105 and turning back the escapement-block until the shoulder 103 is in the path of the next lug 99, which engages it as the collar flies around under the impulse of the spring. The succeeding operations of the drill are performed in the same manner, the spring 95, which is wound during a portion of the rotation of the gear, causing the rotation of the arbor and the escapement arresting and releasing it, while the projection of the drill through the button is caused by cam projections 90 and 92. When the arbor has made a complete rotation and all four eyes have been drilled, the cam 92 enters the deep recess 91 and allows the arbor to be moved by the springs 98 back to clear the chuck-holder, which is then free to make a partial rotation and bring the next chuck in line with the drill-arbor. It will be understood that the back-stop 77 is brought by its cam up against the back of the button being drilled and is maintained in this position during the entire operation and only leaves it at the time the drill-arbor is withdrawn ready for the rotation of the chuck-holder.

During the operation of the machine, which is continuous, each of the chucks has a blank in it and the operations necessary to complete the buttons being performed in succession without removal from the chucks, the operator simply removing the completed buttons and inserting new blanks, by the manipulation of the lever 22 when the arm carrying the latter is close to the chuck-holder.

As before stated, the tools that shape the face and rear of the blank may be of any suitable construction; but I prefer to make them of such form that they will cut rapidly with a comparatively few rotations of the arbor and therefore make them of two disks 150, cut away at one point to form a knife-edge, while the periphery of each is formed to one-half the outline to be given the blank, as shown in Fig. 23, the two disks being securely clamped together and to the arbor by a bolt 151, and the cutting edges being arranged on opposite sides of the center of rotation. From this construction it will be seen that the cutters may be adjusted on the bolt 151 and sharpened by grinding their radially-extending surfaces. These cutters are adapted more particularly for forming the faces of shallow buttons and for truing the backs of the blanks; but when desired to cut larger or deeper buttons the cutter-disks are mounted on separate centers on opposite sides of the center of rotation of the arbor, as shown in Fig. 24, and this arrangement will afford the necessary clearance. It is of course immaterial what form be given to the peripheries of the cutters, and they may be readily and cheaply constructed by bringing all parts of the edge of a disk of metal in contact with a suitable metal-cutting tool and the notch necessary for the cutting-lip be formed afterward.

The machine as a whole is simple, compact, and there are comparatively few parts, none of them small or delicate or liable to get out of order, and all are easily lubricated, and while it is particularly adapted to making buttons out of blanks of mother-of-pearl other materials could well be employed, as ivory, rubber, celluloid, horn, vegetable ivory, bone, &c.

The feature of holding the blanks in position by the stops coöperating with their rear faces while the tools are operating upon them is advantageous in that there is no liability of the blank being twisted in the chuck, and the cams operating the stops cause the latter to engage firmly with the blanks, while the cams actuating the cutter-arbors cause the gradual feed.

While I prefer to secure the actuating-cams directly to the gear-sleeves and arrange stationary projections on the frame, this could be reversed, if desired, and other modifications could be made without departing from the spirit of my invention.

I claim as my invention—

1. The combination with the rotary chuck-holder, a series of chucks thereon, and means for intermittently rotating said holder, of two rotating and longitudinally-movable arbors, one on each side of the chuck-holder, and each carrying a cutting-tool, a blank-stop coöperating with each arbor and arranged on the opposite side of the holder therefrom, a rotary and laterally and longitudinally movable spindle, and a drill carried thereby, a blank-stop on the opposite side of the holder from the drill and coöperating therewith, and means for moving the arbors, drill, spindle and the blank-stops toward the holder simultaneously.

2. The combination with the rotary chuck-holder, a series of chucks thereon, and means for rotating the holder intermittently, of two rotary arbors, one arranged on each side of the chuck-holder and each carrying cutting-tools, bearings for said arbors, rotary sleeves loose on the arbors and having cam-surfaces coöperating with stationary projections to cause the movement of the arbors toward the chuck-holder, substantially as described.

3. The combination with the rotary chuck-holder, a series of chucks thereon, and means for rotating the holder intermittently, of two rotary arbors carrying cutting-tools, one arranged on each side of the holder, a sleeve rotating loosely on each of the arbors, coöperating with it to move it longitudinally and having a cam-surface, and stationary projections with which the cam-surfaces coöperate.

4. The combination with a rotary chuck-holder, a series of blank-chucks thereon, and means for rotating said holder intermittently, of two rotary arbors, one on each side of the holder and each carrying a cutting-tool, a sleeve rotating loosely on each of the arbors, coöperating with it to move it longitudinally and having a cam-surface, stationary projections with which said surfaces coöperate, opposing blank-stops, one arranged opposite each cutting-tool, and operating mechanism timed with the rotary sleeves to bring the stops against one side of the blanks when the cutting-tools are brought in contact with the other side.

5. The combination with a rotary chuck-holder, a series of blank-chucks thereon, and means for rotating said holder intermittently, of two rotary and longitudinally-movable arbors, one on each side of the holder and a cutting-tool on each of them, a rotary drill-spindle and a drill thereon arranged on one side of the chuck-holder, a laterally and longitudinally movable support for the drill-spindle, a series of blank-stops coöperating with each of the cutting-tools and the drill, and devices for causing the simultaneous approach of the tools and the stops while the chuck-holder is at rest.

6. The combination with the chuck-holder, a series of blank-chucks thereon, and means for rotating said holder intermittently, of two rotary and longitudinally-movable arbors, one on each side of the holder, a cutting-tool on each arbor, a rotary cam-sleeve on each arbor engaging and moving the latter toward the holder, springs for moving the arbors from the holder, stationary projections engaged by the cam-sleeves, two blank-stops coöperating with the cutting-tools, longitudinally-movable arbors on which said stops are mounted, springs for retracting the arbors, the rotary cam-sleeves encircling the arbors and the projections with which said sleeves coöperate.

7. The combination with the rotary chuck-holder, a series of blank-chucks thereon, and means for rotating said holder intermittently, of rotary and longitudinally-movable arbors carrying cutting-tools arranged on opposite sides of the holder, movable blank-stops arranged opposite the cutting-tools and coöperating therewith, a rotary drill-spindle, a drill thereon, a rotary and longitudinally-movable spindle-support in which the drill-spindle is mounted eccentrically, and means for intermittently rotating the spindle-support and moving it longitudinally, and a blank-stop coöperating with the drill-spindle, substantially as described.

8. The combination with the supporting-frame, and a blank-holder, of a rotary and longitudinally-movable arbor, an operating-tool carried thereby, a cam-sleeve rotatable loosely on the arbor and coöperating with the latter and the frame to move the arbor longitudinally, and spring devices for retracting said arbor, substantially as described.

9. The combination with the supporting-frame and a blank-holder, of a rotary and longitudinally-movable arbor, an operating-tool carried thereby, a blank-stop arranged opposite the tool, a longitudinally-movable arbor carrying the blank-stop, cam-sleeves rotatable loosely on both arbors and connected for simultaneous operation, said sleeves operating to move the arbors toward the blank, and means for retracting said arbors, substantially as described.

10. The combination with the frame and a blank-holder, of a rotary and longitudinally-movable arbor, an operating-tool carried thereby, a blank-stop arranged opposite the tool, a longitudinally-movable arbor carrying the blank-stop, cam-sleeves rotatable loosely on the arbors connected for simultaneous operation and operating to move the arbors toward the blank located between them, the cam-surface operating the tool-arbor having a relatively gradual rise to feed the tool, and the surface operating the stop having a more abrupt rise to hold the blank, substantially as described.

11. The combination with the rotary chuck-holder, a series of blank-chucks thereon, and means for rotating said holder intermittently, of two adjacent longitudinally-movable arbors adapted to coöperate with blanks in the chucks, intermeshing gears loose on the arbors, cams on the gears, and relatively stationary projections with which said cams coöperate to move the arbors toward the holder.

12. The combination with a movable blank-support having a series of blank-holders thereon, of an intermittently rotating and reciprocating arbor, a rotating drill-spindle journaled eccentrically upon the arbor, and movable longitudinally therewith, a drill on the spindle, devices for causing the intermittent partial rotation of the arbor, and cam devices for varying the extent of the reciprocation of the arbor, whereby the arbor is retracted a greater distance to cause the drill to clear the holder and a shorter distance to clear the blank only, substantially as described.

13. The combination with a blank-support, an intermittently-rotatable and longitudinally-movable arbor, a rotary spindle journaled eccentrically upon the arbor, and a drill carried thereby, of means for actuating the arbor longitudinally, a tension device for rotating the arbor, and an escapement controlling the rotation of the arbor and actuated by the longitudinal movement of the latter.

14. The combination with a blank-support, an intermittently-rotatable and longitudinally-movable arbor, and a rotary drill-spindle journaled eccentrically thereon, of a wheel journaled loosely on the arbor and having a plurality of cam-surfaces, an elastic connection between the wheel and arbor, and an escapement for controlling the rotation of the arbor actuated by the longitudinal movement of the latter.

15. The combination with a blank-support, an arbor, and a rotary drill-spindle supported eccentrically thereon, of the wheel journaled loosely on the arbor, cam-surfaces between said wheel and a relatively stationary portion of the frame for causing the longitudinal movement of the arbor, an elastic connection between the wheel and arbor, a series of projections on the arbor, and an escapement coöperating with said projections and controlling the rotation of the arbor.

16. The combination with a blank-support, an arbor and a rotary drill-spindle supported thereon, of the wheel journaled loosely on the arbor having the plurality of cam-surfaces and a relatively deep recess, a projection engaged by the cam, springs for retracting the arbor, a series of projections on the arbor, and the escapement coöperating with said projections and operating to release the arbor by the longitudinal movement of the latter.

17. The combination with a blank-holder, a rotary and longitudinally-movable drill-spindle, a rotary support on which the drill-spindle is eccentrically mounted, and means for governing the rotation of the support, of cam devices for varying the extent of longitudinal movement of the spindle relative to the blank-holder during the rotation of the support, substantially as described.

18. The combination with a blank-holder, a rotary and reciprocating arbor and the rotary drill-spindle supported eccentrically upon the arbor, of means for rotating and reciprocating the arbor, a series of projections on the arbor and an escapement controlling the rotation of the arbor and actuated by the longitudinal movement thereof.

19. The combination with the rotary and longitudinally-movable arbor, and the drill-spindle supported eccentrically thereon, of a series of projections on the arbor, a spring for rotating the arbor, and the oscillatory escapement-block having the shoulders 102, 103, 105 and 106 coöperating with the projections on the arbor, substantially as described.

20. The combination with the chuck-holder, a series of blank-chucks thereon, and means for intermittently rotating said holder, of two series of longitudinally-movable arbors, one series located on each side of the chuck-holder and carrying devices for operating upon blanks held in the chucks, intermeshing gear-wheels rotating loosely on the arbors of each series, movable longitudinally with the arbors, and having cam-surfaces thereon, and the relatively stationary projections with which the cam-surfaces coöperate, substantially as described.

21. The combination with the rotary chuck-support having a series of apertures therein, of a series of radially-movable blank-holding chuck-jaws around each aperture, a series of rotating rings, one for each set of jaws coöperating with the jaws and moving them toward and from each other, and springs actuating the rings in a direction to cause the jaws to clamp a blank at the edges only, substantially as described.

22. The combination with the rotary chuck-support, and a series of blank-holding chucks thereon, each embodying the radially-movable holding-jaws, a movable member for actuating said jaws, and a spring for operating the member in a direction to clamp the blank, of a movable support embodying a blank-stop, an ejector, and a movable arm on the support having a projection adapted to engage the movable member to open the chuck and release and eject the blank, substantially as described.

23. The combination with the chuck-holder having the aperture through it, and the two projections thereon for engaging chuck-jaws, of the ring having radial ways therein, the jaws operating in the ways and having cam-surfaces coöperating with the projections on the holder, and a spring for rotating the ring in a direction to cause the inthrust of the jaws, substantially as described.

24. The combination with the rotatable chuck-holder having the apertures through it, a series of chucks, each having the radially-movable chuck-jaws, the movable member for opening them, and the spring for closing them, of the movable support, the blank-stop thereon and the ejector, the lever mounted on the support, and the spring projection on said support adapted to engage the chuck-ring when moved in one direction, substantially as described.

25. A rotary cutting-tool for button-lathes consisting of a support adapted to be rotated, two disks notched at their peripheries to form cutting-lips and secured side by side upon axes transverse to the plane of rotation of the support, said lips being oppositely arranged on opposite sides of the center of rotation of the support, substantially as described.

26. In a machine for turning buttons, the combination with a rotary chuck-holder, a series of blank-chucks thereon, two sets of longitudinally-reciprocating arbors, one set arranged on each side of the holder and having devices for coöperating with the blanks in the chucks, of gears loosely sleeved on each of the arbors, those of each set intermeshing, cam devices operated by the gears for causing the longitudinal movement of the arbors, a holding-pin for arresting the holder, and a constantly-rotating shaft having the arm for rotating the chuck-holder, the gears meshing with the gears on the arbors, and the cam coöperating with the holder-locking pin for releasing it when the arm actuates the holder, substantially as described.

FREDERICK D. FOSTER.

Witnesses:
WILLIAM J. MEAGHER,
HENRY J. ANDREWS.